US011403567B2

(12) United States Patent
Tokuchi

(10) Patent No.: US 11,403,567 B2
(45) Date of Patent: Aug. 2, 2022

(54) APPARATUS, MANAGEMENT SYSTEM, AND NON-TRANSITORY COMPUTER READABLE MEDIUM

(71) Applicant: FUJIFILM Business Innovation Corp., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 493 days.

(21) Appl. No.: 16/105,951

(22) Filed: Aug. 20, 2018

(65) Prior Publication Data
US 2019/0130315 A1 May 2, 2019

(30) Foreign Application Priority Data

Oct. 26, 2017 (JP) .............................. JP2017-207329

(51) Int. Cl.
*G06Q 10/02* (2012.01)
*G10L 25/18* (2013.01)
*G10L 25/78* (2013.01)

(52) U.S. Cl.
CPC .............. *G06Q 10/02* (2013.01); *G10L 25/18* (2013.01); *G10L 25/78* (2013.01)

(58) Field of Classification Search
CPC .......... G06Q 10/02; G10L 25/18; G10L 25/78
See application file for complete search history.

(56) References Cited

U.S. PATENT DOCUMENTS

| 9,021,395 | B2 | 4/2015 | Sakata et al. | |
|---|---|---|---|---|
| 10,013,982 | B2 | 7/2018 | Mizumoto et al. | |
| 2014/0229219 | A1* | 8/2014 | Hiller | G06Q 10/06 705/7.19 |
| 2016/0342950 | A1* | 11/2016 | Pignataro | G06Q 10/1095 |
| 2017/0357917 | A1* | 12/2017 | Holmes | G06Q 10/1093 |
| 2018/0063283 | A1 | 3/2018 | Mochizuki et al. | |
| 2018/0253666 | A1* | 9/2018 | Fix | G06Q 10/02 |
| 2019/0020556 | A1* | 1/2019 | Pefkianakis | H04L 43/16 |

FOREIGN PATENT DOCUMENTS

| JP | 2004206698 | 7/2004 |
|---|---|---|
| JP | 2008083924 | 4/2008 |
| JP | 2010073135 | 4/2010 |
| JP | 2011048505 | 3/2011 |
| JP | 2015079319 | 4/2015 |

(Continued)

OTHER PUBLICATIONS

L. Duc Tran et al., "A smart meeting room scheduling and management system with utilization control and ad-hoc support based on real-time occupancy detection," 2016, IEEE Sixth International Conference on Communications and Electronics (ICCE), 2016, pp. 186-191, doi: 10.1109/CCE.2016.7562634. (Year: 2016).*

(Continued)

*Primary Examiner* — George Chen
*Assistant Examiner* — Wayne S. Murray
(74) *Attorney, Agent, or Firm* — JCIPRNET

(57) ABSTRACT

An apparatus includes an extension unit that, if it is estimated that a user who is using a space will not exit in a reservation period and a next reservation of the space satisfies a certain condition, extends a current reservation of the space.

14 Claims, 18 Drawing Sheets

(56) References Cited

FOREIGN PATENT DOCUMENTS

| | | |
|---|---|---|
| JP | 2016012216 | 1/2016 |
| JP | 2016189121 | 11/2016 |
| JP | 2016206261 | 12/2016 |
| JP | 2017112545 | 6/2017 |
| JP | 2017112601 | 6/2017 |
| WO | 2013057882 | 4/2013 |

OTHER PUBLICATIONS

"Office Action of Japan Counterpart Application" with English translation thereof, dated Aug. 31, 2021, p. 1-p. 14.
"Office Action of Japan Counterpart Application" with English translation thereof, dated Mar. 23, 2022, p. 1-p. 5.

* cited by examiner

FIG. 8

| CONVERSATIONAL FEATURE | EXTENSION LIKELY | EXTENSION UNLIKELY |
|---|---|---|
| NO BREAKS | ✓ | |
| CONCLUDING PHRASE SUCH AS "SEE YOU" OR "NEXT TIME" | | ✓ |
| HIGH VOLUME | ✓ | |
| LARGER AMOUNT | ✓ | |
| HIGHER FREQUENCY | ✓ | |

FIG. 9

| ANOTHER USER'S SITUATION | EXTENSION LIKELY | EXTENSION UNLIKELY |
|---|---|---|
| NO BREAKS | ✓ | |
| EXTENDED RESERVATION | ✓ | |
| CONTINUES WORKING | ✓ | |
| PREPARING TO LEAVE (PUTTING NOTEBOOK OR PC INTO BAG) | | ✓ |

FIG. 10

| WORK (MOTION) | EXTENSION LIKELY | EXTENSION UNLIKELY |
|---|---|---|
| CONTINUES USING PC | ✓ | |
| PREPARING TO LEAVE (PUTTING NOTEBOOK OR PC INTO BAG) | | ✓ |

FIG. 11

| DEVICE OPERATION STATUS | EXTENSION LIKELY | EXTENSION UNLIKELY |
|---|---|---|
| MAJORITY OF DEVICES ARE BEING USED | ✓ | |
| LARGE NETWORK LOAD (DOWNLOADING OR UPLOADING) | ✓ | |

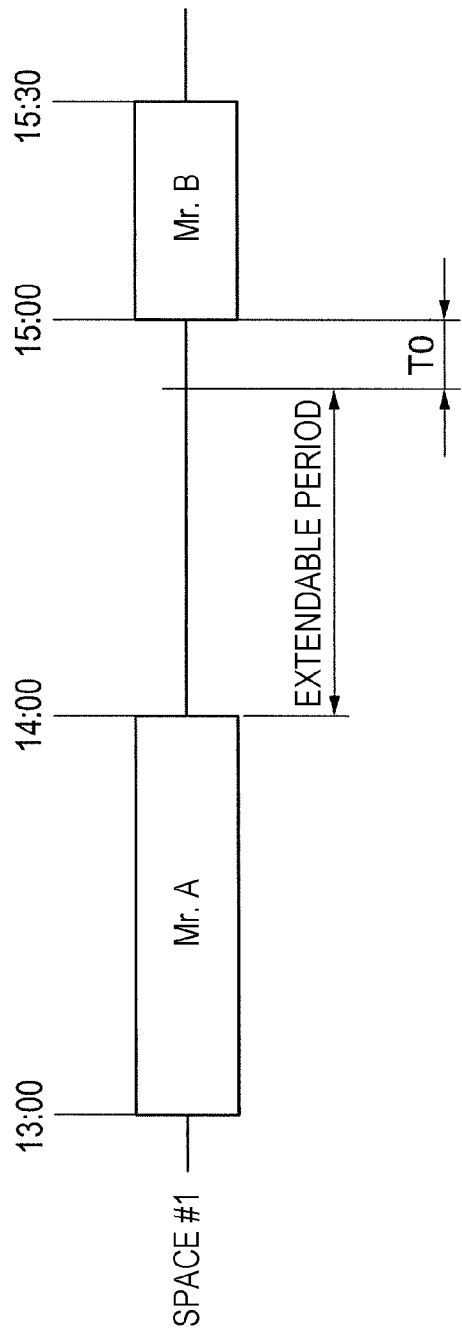

FIG. 17

| 151 | 152 DISTANCE TO DESTINATION (TIME) | 153 TRANSPORTATION COST | 154 AVAILABLE PERIOD | 155 EQUIPMENT | ... | 156 EVALUATION |
|---|---|---|---|---|---|---|
| POINT A SPACE #4 | DESIRABLE | DESIRABLE | UNDESIRABLE | UNDESIRABLE | | 4TH |
| POINT A SPACE #2 | DESIRABLE | DESIRABLE | SATISFACTOR | DESIRABLE | | 1ST |
| POINT B SPACE #4 | SATISFACTOR | DESIRABLE | DESIRABLE | FINE | | 2ND |
| POINT C SPACE #5 | UNDESIRABLE | FINE | DESIRABLE | DESIRABLE | | 3RD |
| POINT D SPACE #1 | FINE | UNDESIRABLE | FINE | FINE | | 5TH |

APPARATUS, MANAGEMENT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-207329 filed Oct. 26, 2017.

BACKGROUND

Technical Field

The present invention relates to an apparatus, a management system, and a non-transitory computer readable medium.

SUMMARY

According to an aspect of the invention, there is provided an apparatus includes an extension unit that, if it is estimated that a user who is using a space will not exit in a reservation period and a next reservation of the space satisfies a certain condition, extends a current reservation of the space.

BRIEF DESCRIPTION OF THE DRAWINGS

An exemplary embodiment of the present invention will be described in detail based on the following figures, wherein:

FIG. 8 is a diagram illustrating an example of relationships between a user's conversational features and results of estimation;

FIG. 9 is a diagram illustrating an example of relationships between another user's situations and results of estimation;

FIG. 10 is a diagram illustrating an example of relationships between types of work that the user is doing and results of estimation;

FIG. 11 is a diagram illustrating an example of device operation statuses and results of estimation;

FIG. 12 is a diagram illustrating an extendable period;

FIG. 13A illustrates a screen for notifying the next user of an alternative space and determining whether to accept to change the reservation, and FIG. 13B illustrates an example of a screen for notifying the next user of an updated reservation;

FIG. 17 is a diagram illustrating an example of a table referred to when the extension control unit presents alternative spaces to the user;

FIG. 18A illustrates a screen for asking the user whether to reserve another space, FIG. 18B illustrates a screen for presenting a first-place space, and FIG. 18C illustrates a screen for presenting a second-place space.

DETAILED DESCRIPTION

An exemplary embodiment of the present invention will be described hereinafter with reference to the drawings.

Exemplary Embodiment

Overall Configuration of Management System

As communication speed improves and communication terminals are reduced in size, various pieces of information can now be accessed from outside offices in many environments. Because business conversations and information are highly confidential, on the other hand, such environments need to be quiet and secure.

A management system for providing spaces that satisfy these requirements will be described in the present exemplary embodiment. The spaces that will be described hereinafter, however, may be used privately, instead for business purposes.

Figure 1:
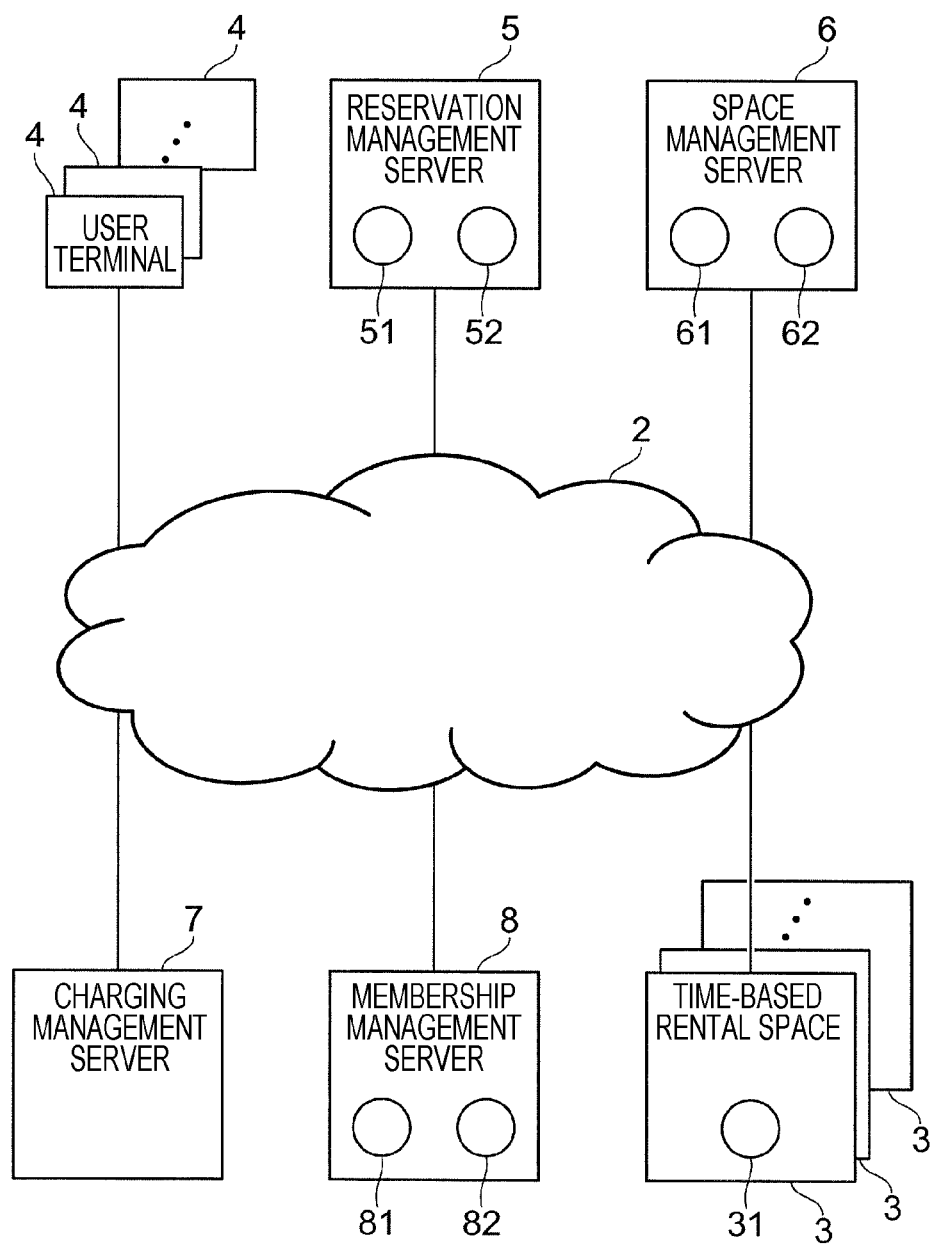
FIG. 1 is a diagram schematically illustrating an example of the overall configuration of a management system.

FIG. 1 is a diagram schematically illustrating an example of the overall configuration of a management system 1.

As illustrated in FIG. 1, the management system 1 includes various terminals connected to a cloud network 2.

FIG. 1 illustrates, as an example of the terminals included in the management system 1, plural time-based rental spaces 3, plural user terminals 4 carried by users who use the time-based rental spaces 3, a reservation management server 5 that manages reservations of the time-based rental spaces 3, a space management server 6 that manages use conditions of the time-based rental spaces 3, a charging management server 7 that manages charging of the users, and a membership management server 8 that manages information regarding members who can use the time-based rental spaces 3.

The time-based rental spaces 3 according to the present exemplary embodiment can be used every day around the clock except for maintenance time and the like.

Although one server is prepared for each purpose (function) in FIG. 1, plural servers may be prepared for each purpose, instead. Alternatively, a single server may achieve plural purposes (functions).

One or plural organizations may provide a time-based rental service of the time-based rental spaces 3. Different organizations may manage, for example, reservations, entry, exit, and use conditions of the time-based rental spaces 3, charging of the users, and members registered as users. Plural organizations may cooperatively achieve one of these purposes (functions), instead.

In addition, plural servers may be prepared for each purpose (function). When a single organization prepares plural servers for each purpose (function) or plural servers corresponding to plural purposes (functions), the servers may be connected to one another through an intranet.

In addition, one or plural organizations may provide the time-based rental spaces 3.

That is, the management system 1 may be achieved as an aggregation of services provided by plural organizations.

In the present exemplary embodiment, electronic keys are used for locking and unlocking. The electronic keys are stored in the user terminals 4 or integrated circuit (IC) cards capable of performing near-field communication. When a user terminal 4 is used as an electronic key, the reservation management server 5 provides an electronic key for the user terminal 4 after a reservation is confirmed. When an IC card is used as an electronic key, the reservation management server 5 provides an IC card storing an electronic key after a reservation is confirmed.

When electronic keys are used, time periods for which locking and unlocking can be effectively performed can be freely determined. In addition, plural electronic keys for using a certain time-based rental space 3 can be issued for the same time period.

Alternatively, plural physical keys may be prepared for reservation periods, and a time-based rental space 3 may be locked and unlocked. Alternatively, authentication of the users may be performed instead of, or in addition to, the use of electronic keys or physical keys.

The reservation management server 5 manages, for example, a registration list 51 in which available time-based rental spaces 3 are registered and a reservation list 52 that manages assignment of users who desire to use the time-based rental spaces 3.

In the present exemplary embodiment, the reservation management server 5 accepts reservations of the time-based rental spaces 3 every day around the clock except for maintenance time and the like. The reservation management server 5 also issues electronic keys for the user terminals 4 and authenticates the user terminals 4 as necessary. The space management server 6 may perform the authentication, instead.

The space management server 6 manages entry and exit information 61 and use condition information 62 regarding the time-based rental spaces 3. The space management server 6 also has a function of communicating with an authentication unit 32A (refer to FIG. 2) provided for each time-based rental space 3 and determining whether to permit a user to enter the time-based rental space 3. During the authentication, the space management server 6 communicates with the reservation management server 5.

The space management server 6 also has a function of collecting information from various devices 31 provided in each time-based rental space 3 and controlling the devices 31.

Although the space management server 6 is connected to the cloud network 2 in the example illustrated in FIG. 1, the time-based rental spaces 3 may achieve some or all of the functions achieved by the space management server 6, instead.

The charging management server 7 has a function of submitting a bill to each member (a natural person or a corporation) on the basis of reservation information, user information, entry and exit information, and the like. The charging management server 7 obtains the reservation information from the reservation management server 5, the entry and exit information from the space management server 6, and the membership information from the membership management server 8.

The membership management server 8 manages registered membership information and user information. When members are natural persons, the members and users match. When members are corporations, on the other hand, individual users are registered for each member and managed.

Figure 2:
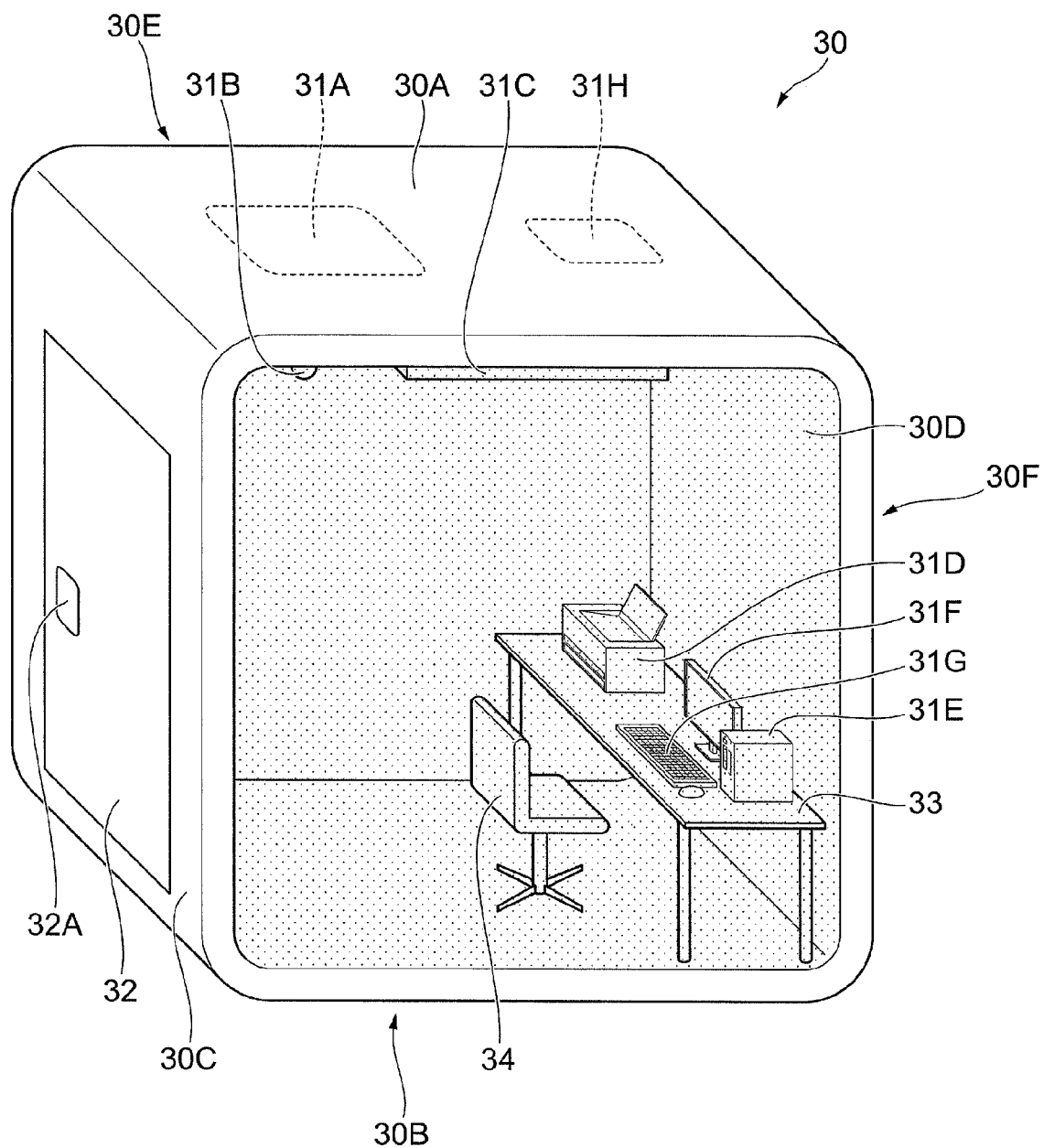
FIG. 2 is a diagram illustrating an example of the appearance of a time-based rental space used by users.

FIG. 2 is a diagram illustrating an example of the appearance of a time-based rental space 3 used by the users.

The time-based rental space 3 according to the present exemplary embodiment is installed in, for example, a station, an airport, an office building, a commercial institution such as a restaurant or a department store, a bank, a library, an art gallery, a museum, a public facility or institution, a corridor, a park, or any other indoor or outdoor area.

A soundproof chamber is assumed as the time-based rental space 3 in the present exemplary embodiment. The time-based rental space 3 is an example of a closed space in this sense. In the present exemplary embodiment, "closed" does not mean sealed but means presence of practical soundproofing properties. An opening or a gap such as a vent or a small window may therefore be provided for a framework 30 of the time-based rental space 3.

The framework 30 according to the present exemplary embodiment includes a ceiling 30A, a floor 30B, a wall 30C on which a door 32 is provided, two walls 30D and 30E located on sides of the wall 30C, and a wall 30F opposite the door 32.

The door 32 is a swing door including one leaf that opens in an arc only in one direction in the present exemplary embodiment. Alternatively, the door 32 may be a double door, that is, the door 32 may include two leaves for a single opening.

Alternatively, the door 32 may be a sliding door. The sliding door may be a single sliding door, a double sliding door, or a sliding door including three or more leaves.

Alternatively, the door 32 may be a folding door including two leaves connected to each other by a hinge. The folding door may open in one direction or two directions.

Alternatively, the door 32 may be of a special type, such as a sliding door that can be stored inside a wall or a partition door.

The door 32 may open outward or inward.

In the present exemplary embodiment, part of the walls 30D and 30E is composed of a transparent material (e.g., glass or an acrylic resin).

Alternatively, at least part of the walls 30D and 30E may employ a structure, a material, or a type of working that screens the time-based rental space 3 (makes it difficult to observe the inside or decreases visibility).

The walls 30D and 30E may be, for example, composed of a translucent material, formed of members whose surfaces are ground so that light scatters thereon, or may be provided with film-like members having a similar function. The film-like members may be liquid crystal films that electrically switches between a transparent state and a frosted state or polarizing films capable of electrically adjusting transmittance.

Alternatively, a structure or a member for screening may be separately prepared. Alternatively, the walls 30D and 30E may be composed of an opaque material as with other surfaces. Alternatively, three or more surfaces may be composed of a transparent or translucent material.

The number of persons accommodated by the time-based rental space 3 is substantially determined on the basis of the volume of the time-based rental space 3. Although the time-based rental space 3 is a private room and basically used by one person at a time in the present exemplary embodiment, the time-based rental space 3 may be a large room that can accommodate a large number of persons. The time-based rental spaces 3 may be configured as separate rooms, or may be connected to one another by removing the walls 30D and/or the walls 30E thereof.

The time-based rental space 3 as a private room need not necessarily be used by one person at a time but may be used by a couple of persons, namely two to three persons, instead.

The shape and structure of the framework 30 that forms the time-based rental space 3 and types and performance of equipment to be provided may be arbitrarily determined.

In the present exemplary embodiment, a desk 33 and a chair 34 are provided inside the framework 30. A printing device 31D, a computer 31E, a display device 31F, and an input device 31G, which are an example of devices 31, are provided on the desk 33. Data and information regarding a history stored in the computer 31E are all deleted by the system after use in order to protect privacy.

The devices 31 also include an air conditioner 31A, a human detection sensor 31B, a lighting device 31C used to illuminate the time-based rental space 3, a control device 31H that controls the operation of electronic devices including the devices 31, and an authentication unit 32A.

The specific electronic devices described above as the devices 31 are examples. For example, the printing device 31D, the computer 31E, the display device 31F, and the input device 31G on the desk 33 need not be provided. In this case, a user's computer or smartphone is used.

The entirety (includes the framework 30) of the time-based rental space 3 or the control device 31H is an example of an apparatus in the claims. The control device 31H is also an example of a controller in the claims.

In addition, the user terminals 4, the reservation management server 5, the space management server 6, the charging management server 7, and the membership management server 8 are examples of an apparatus in the claims.

In addition, the management system 1 is an example of a management system in the claims.

Configuration of Terminals

An example of the configuration of the terminals included in the management system 1 will be described with reference to FIGS. 3 to 5.

Figure 3:
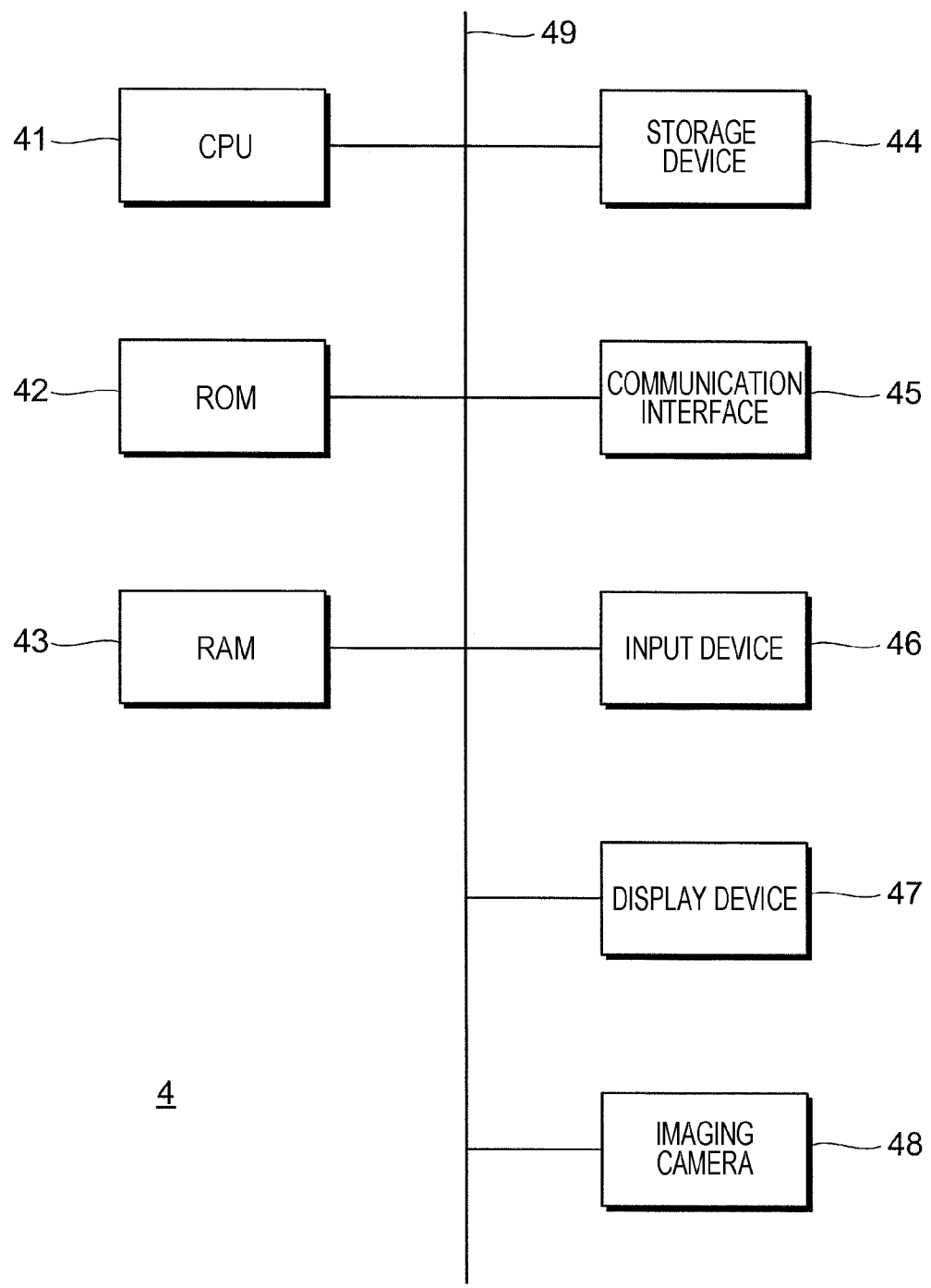
FIG. 3 is a diagram illustrating an example of the hardware configuration of a user terminal.

FIG. 3 is a diagram illustrating an example of the hardware configuration of a user terminal 4.

In the present exemplary embodiment, a smartphone, for example, is used as the user terminal 4.

The user terminal 4 includes a central processing unit (CPU) 41 that provides various functions through firmware and application programs, a read-only memory (ROM) 42, which is a storage area storing the firmware and a basic input/output system (BIOS), and a random-access memory (RAM) 43, which is an area in which the programs are executed.

The user terminal 4 also includes a volatile storage device 44 storing downloaded application programs, electronic keys, and the like, a communication interface 45 used to communicate with the outside, an input device 46 such as a touch panel, a display device 47 used to display information, and an imaging camera 48. The storage device 44 is achieved by, for example, a semiconductor memory.

The CPU 41 is connected to the various devices through a bus 49.

Figure 4:
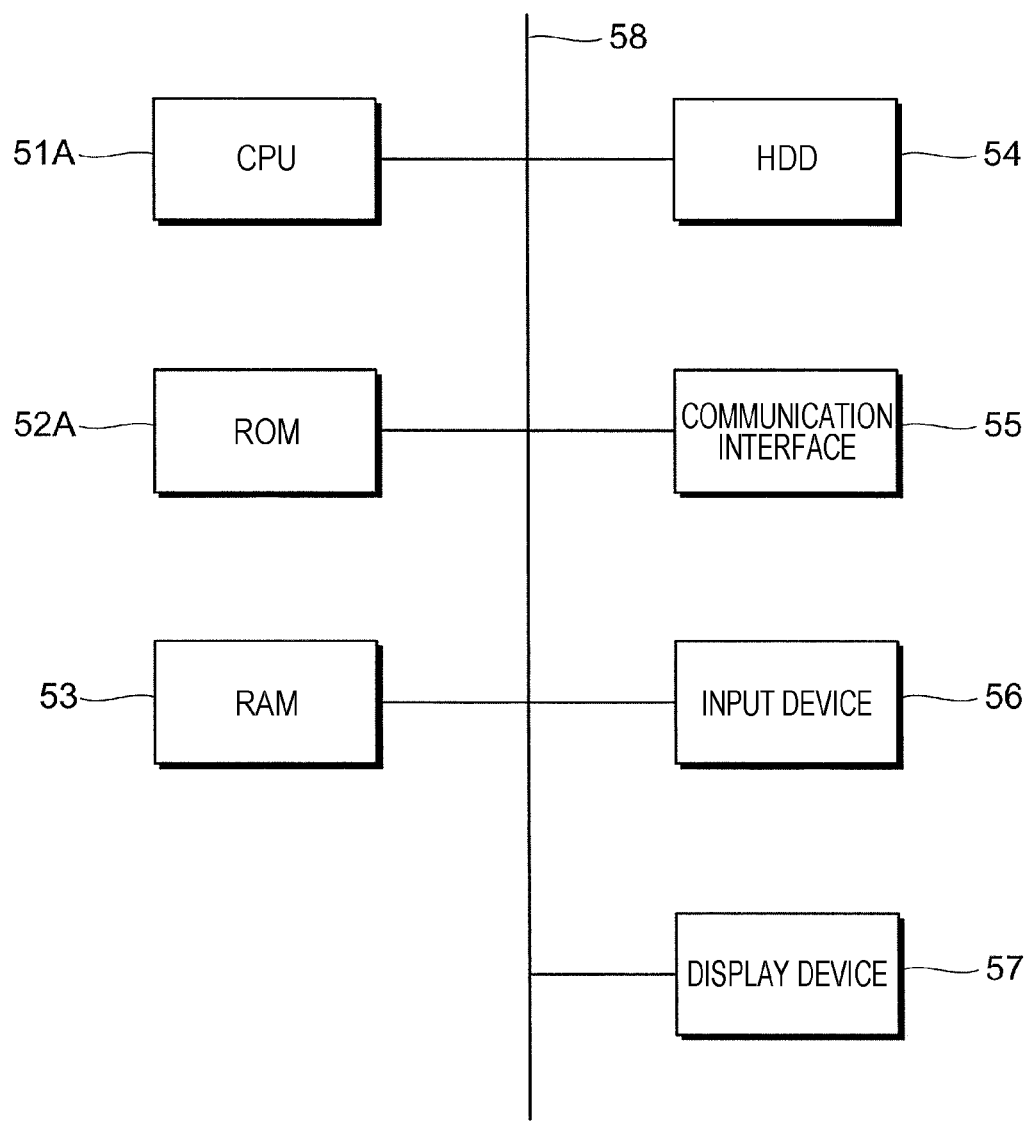
FIG. 4 is a diagram illustrating an example of the hardware configuration of a server included in the management system.

FIG. 4 is a diagram illustrating an example of the hardware configuration of a server included in the management system 1.

FIG. 4 illustrates the configuration of the reservation management server 5 as an example. The other servers, namely the space management server 6, the charging management server 7, and the membership management server 8, have the same configuration as that illustrated in FIG. 4.

The reservation management server 5 includes a CPU 51A that provides various management functions through an operating system and application programs, a ROM 52A, which is a storage area storing the operating system and a BIOS, and a RAM 53, which is an area in which the programs are executed.

The reservation management server 5 also includes a volatile hard disk drive (HDD) 54 storing the application programs for achieving the management functions and various pieces of management data, a communication interface 55 used to communicate with the outside, an input device 56 such as a keyboard, and a display device 57 used to display information.

The CPU 51A and the various devices are connected to one another through a bus 58.

The servers are an example of databases storing management data.

Figure 5:
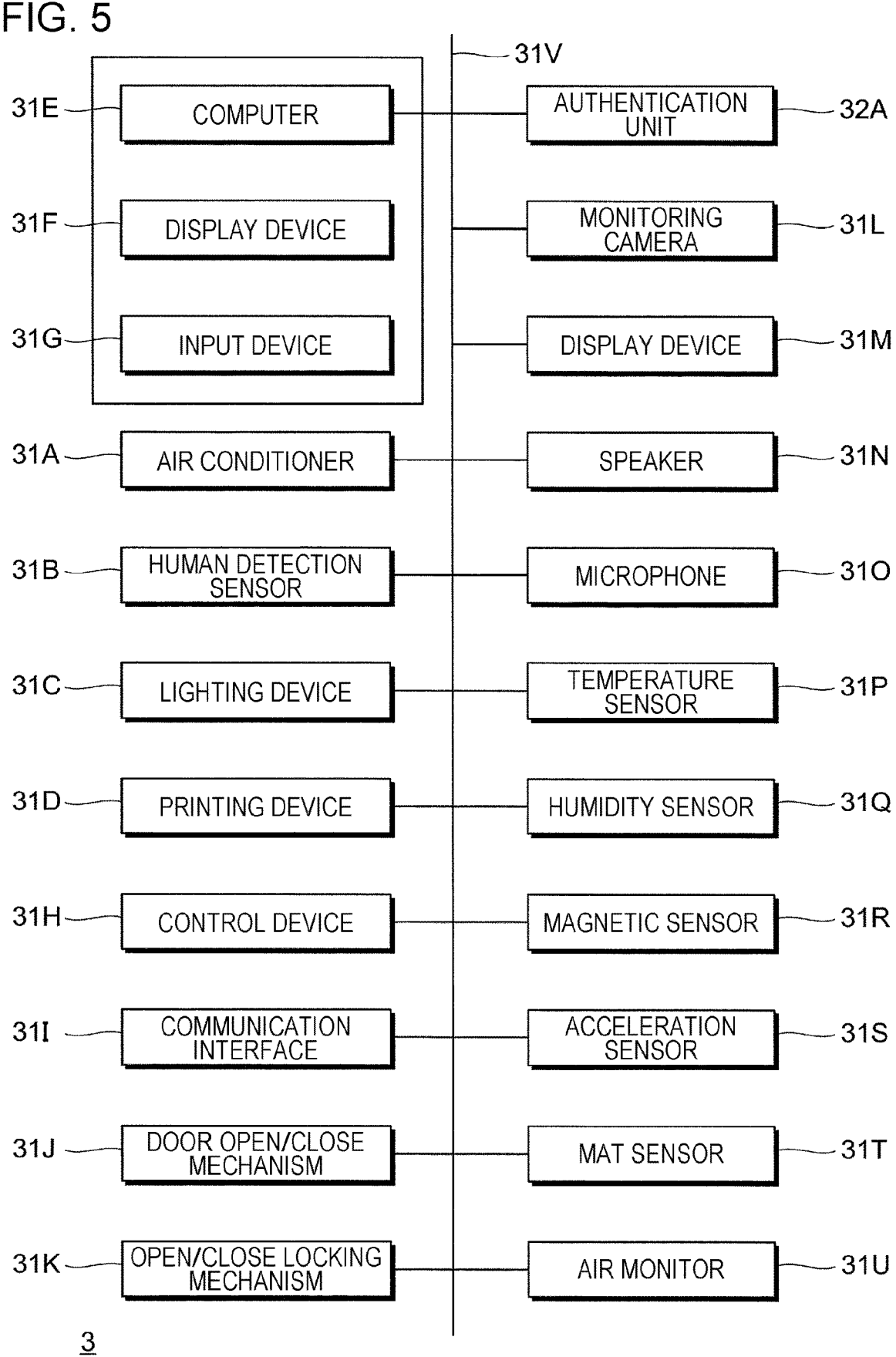
FIG. 5 is a diagram illustrating an example of the configuration of the time-based rental space included in the management system.

FIG. 5 is a diagram illustrating an example of the configuration of a time-based rental space 3 included in the management system 1.

The time-based rental space 3 includes the air conditioner 31A, the human detection sensor 31B, the lighting device 31C, the printing device 31D, the computer 31E, the display device 31F, the input device 31G, the control device 31H, and the authentication unit 32A.

The air conditioner 31A is used to adjust temperature and humidity inside the time-based rental space 3. A mechanism specialized in ventilation may be incorporated into, or provided separately from, the air conditioner 31A.

The human detection sensor 31B is a sensor used to detect a person inside the time-based rental space 3 and can be one of various types. The human detection sensor 31B can be, for example, a pyroelectric infrared human detection sensor capable of detecting human motion, an image human detection sensor or a thermopile human detection sensor capable of detecting the number and positions of persons. One or some of these sensors may be used in accordance with purposes.

The printing device 31D, the computer 31E, the display device 31F, and the input device 31G are an example of information devices prepared inside the time-based rental space 3 and used by users. These devices are connected to one another through a local area network (LAN) 31V (e.g., a LAN cable or a wireless LAN). When a user brings a computer into the time-based rental space 3, the computer is connected to the LAN 31V. Wi-Fi (registered trademark) or Bluetooth (registered trademark), for example, is used for the wireless LAN.

The control device 31H is a control computer that collects information from the devices connected to the LAN 31V and that controls the operation of the devices. Depending on a type of management system 1, the control device 31H might serve as the space management server 6.

The authentication unit 32A is mounted on, for example, the door 32. The authentication unit 32A is used to obtain and transmit information necessary to lock and unlock the door 32. Authentication is performed by the reservation management server 5, for example, and only a result of the authentication is transmitted to the authentication unit 32A. If the authentication has been successfully completed, the authentication unit 32A unlocks the door 32. After the unlocking, the door 32 can be opened, and a user can enter the time-based rental space 3 (refer to FIG. 2).

A communication interface 311 for communicating with the outside is also provided for the time-based rental space 3. The communication interface 311 is connected to the cloud network 2 (refer to FIG. 1) and used to communicate with the various servers.

A door open/close mechanism 31J that mechanically opens and closes the door 32 is provided for the time-based rental space 3. The door open/close mechanism 31J includes, for example, a mechanism for driving the door 32 to open and close the door 32 and a mechanism for adjusting the amount of load needed to open or close the door 32 for a user who is opening or closing the door 32.

An open/close locking mechanism 31K is provided for the time-based rental space 3. The open/close locking mechanism 31K is a mechanism that limits opening and closing of the door 32 performed by a user. While the open/close locking mechanism 31K is operating, at least closing of the door 32 is limited.

A monitoring camera 31L used to monitor a user inside and outside the time-based rental space 3 is provided for the time-based rental space 3. The monitoring camera 31L, however, is not a mandatory component.

A display device 31M is provided for the time-based rental space 3. The display device 31M according to the present exemplary embodiment is disposed, for example, on an outside surface of the wall 30C, on which the door 32 is provided, and operated by a user who desires to enter the time-based rental space 3 and provides information for the user. The display device 31M is also operated by a user who is using the time-based rental space 3 and provides information for the user.

A speaker 31N is provided for the time-based rental space 3. The speaker 31N is used to notify a user inside the time-based rental space 3 of information and a person outside the time-based rental space 3 of information. The speaker 31N is an example of a notification unit.

A microphone 31O is provided for the time-based rental space 3. The microphone 31O is used to obtain sound inside the time-based rental space 3.

A temperature sensor 31P is provided for the time-based rental space 3. The temperature sensor 31P is used to measure temperature inside the time-based rental space 3.

A humidity sensor 31Q is provided for the time-based rental space 3. The humidity sensor 31Q is used to measure humidity inside the time-based rental space 3.

A magnetic sensor 31R is provided for the time-based rental space 3. The magnetic sensor 31R is mounted on the door 32 and detects opening and closing of the door 32 through magnetic detection.

An acceleration sensor 31S is provided for the time-based rental space 3. The acceleration sensor 31S is used to detect the motion of things.

A mat sensor 31T is provided for the time-based rental space 3. The mat sensor 31T is used to detect the weight of things and visualize a stay period of a person and crowdedness.

An air monitor 31U is provided for the time-based rental space 3. The air monitor 31U is a sensor that detects constituent parts of air inside the time-based rental space 3 and measures, for example, levels of particulate matter 2.5 (PM2.5) and PM10, carbon dioxide concentration, temperature, humidity, and concentrations of volatile organic compounds. All of these need not be measured, and other constituent parts may also be measured. When the air monitor 31U is capable of measuring temperature and humidity, the temperature sensor 31P and the humidity sensor 31Q need not be provided.

Control Function

A control function achieved by one or some of the terminals included in the management system 1 will be described with reference to FIG. 6.

A case where the control device 31H independently provides the control function will be described hereinafter.

Figure 6:
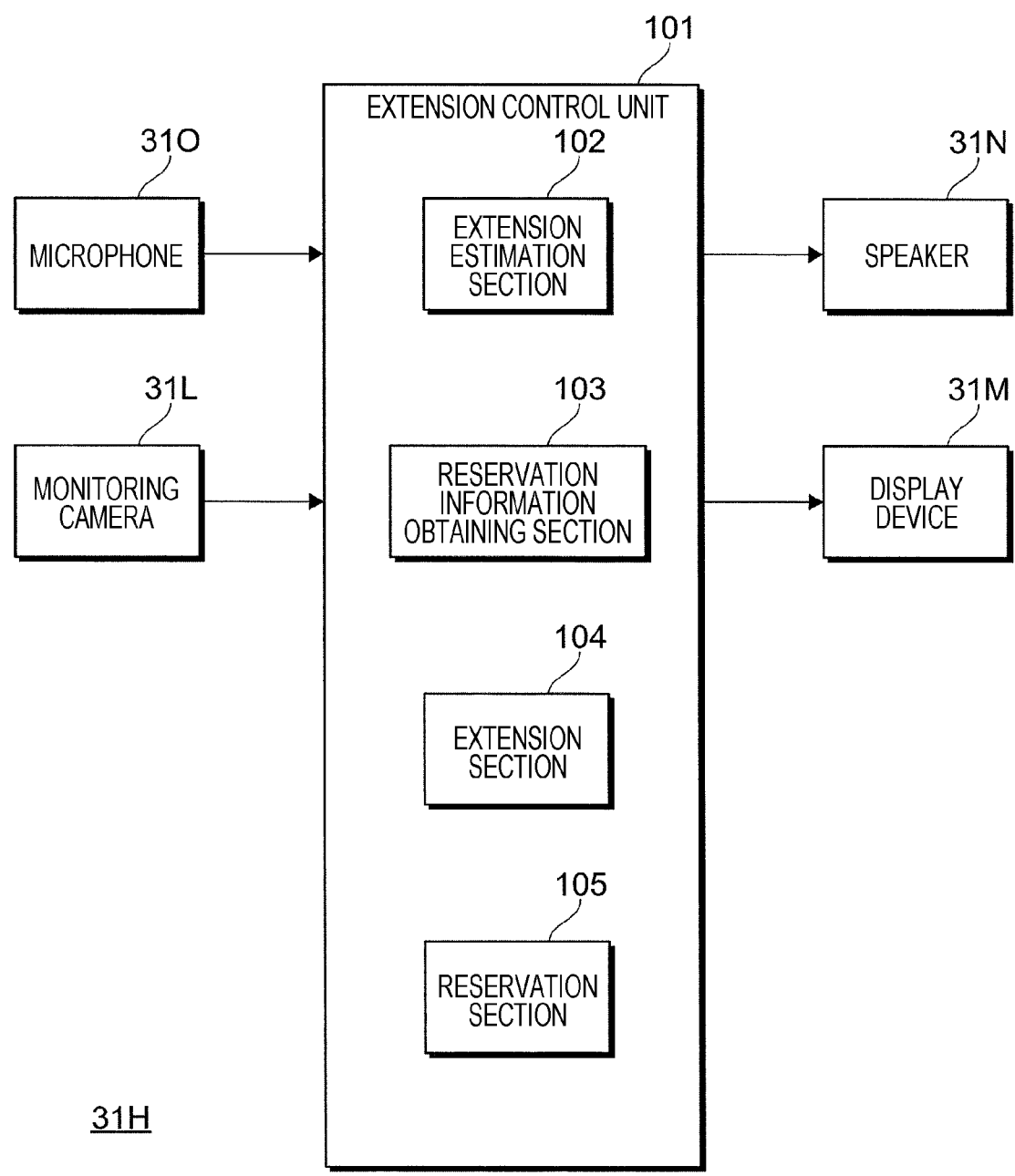
FIG. 6 is a diagram illustrating an example of the software configuration of a control device.

FIG. 6 is a diagram illustrating an example of the software configuration of the control device 31H.

The control device 31H achieves the functions by executing programs.

The control device 31H according to the present exemplary embodiment includes an extension control unit 101 that, if it is estimated that a user who is using the time-based rental space 3 (refer to FIG. 2) will not exit in a reservation period and a next reservation of the time-based rental space 3 satisfies a certain condition, extends a current reservation with a small operation load. The extension control unit 101 also has a function of reserving another time-based rental space 3 as necessary.

The extension control unit 101 is an example of an extension unit in the claims.

The extension control unit 101 according to the present exemplary embodiment has plural functions.

The extension control unit 101 includes, for example, an extension estimation section 102 that estimates whether there is a need to extend a reservation, a reservation information obtaining section 103 that obtains information regarding reservations of the time-based rental space 3, an extension section 104 that performs various processes for extension including an additional reservation, and a reservation section 105 that performs various processes for reserving another time-based rental space 3 when extension is not possible.

The extension estimation section 102 estimates whether there is a need to extend a reservation on the basis of a use condition of a user. The estimation is performed when remaining time of a reservation has become a certain value (e.g., 5 minutes).

Information regarding a use condition is obtained from, for example, imaging data output from the monitoring camera 31L, acoustic data output from the microphone 31O, imaging data and sound data regarding a communication partner (if any), operation conditions of the devices 31 (refer to FIG. 1) included in the time-based rental space 3, and the like. These pieces of information may be obtained while the user is using the time-based rental space 3.

One or some of these pieces of information may be used for the estimation. When plural pieces of information are combined for an analysis, each piece of information may be differently weighted. Weights may reflect a history of information obtained in the past and results of learning of decisions (e.g., whether to extend a reservation) made by the user. The learning may be performed for each user, or unspecified users may be used as a population.

The speaker 31N (refer to FIG. 5) and the display device 31M (refer to FIG. 5) are used to notify the user that the remaining time of a reservation has become short and ask the user whether to extend the reservation. The display device 31F (refer to FIG. 5) set on the desk 33 (refer to FIG. 2) and the user terminal 4 (refer to FIG. 1) may also be used for the notification.

The display device 31M, the display device 31F, and the user terminal 4 are used by the user to input information.

Example of Control

An example of control achieved by the extension control unit 101 (refer to FIG. 6) will be described hereinafter.

Figure 7:
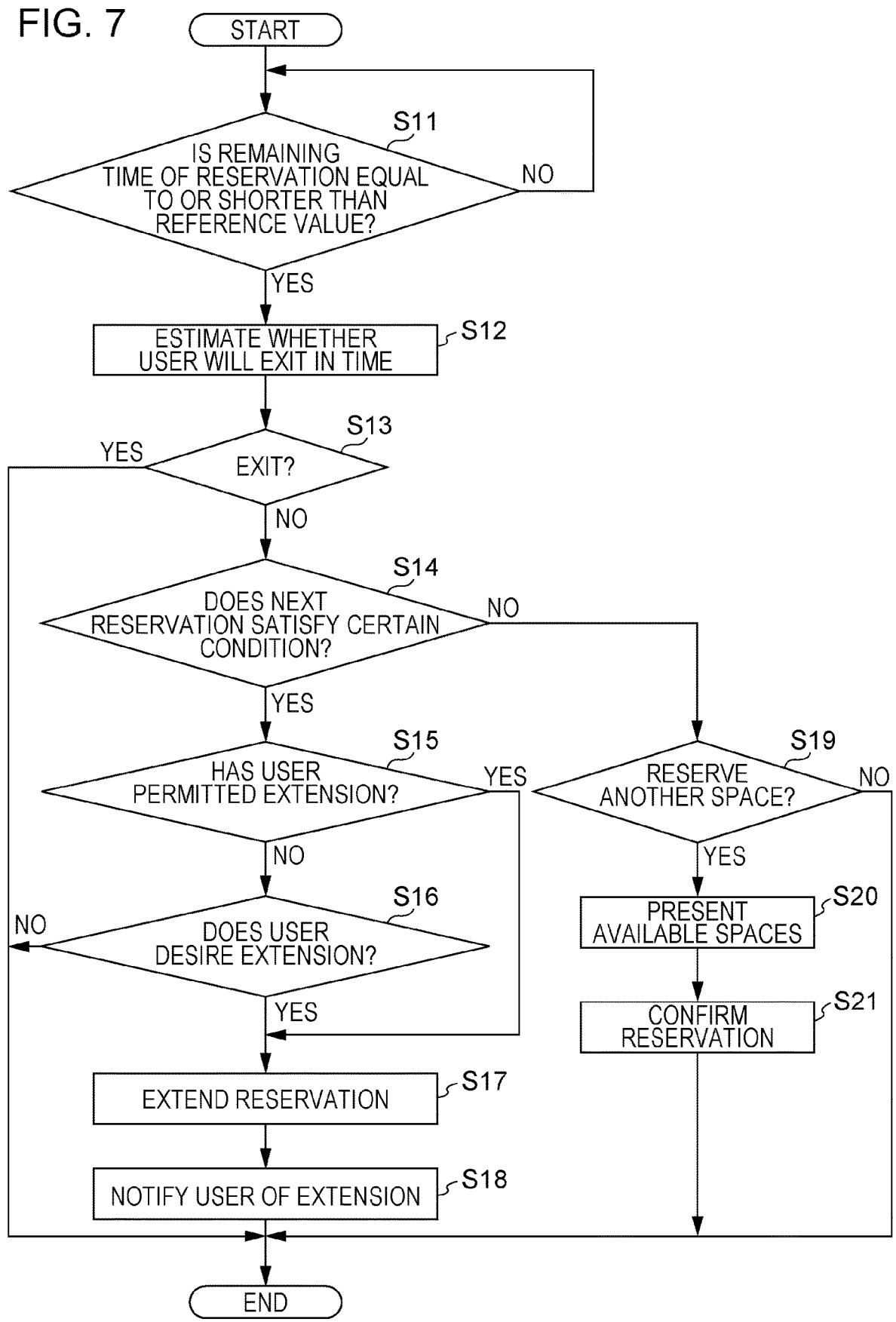
FIG. 7 is a diagram illustrating an example of a control operation performed by an extension control unit.

FIG. 7 is a diagram illustrating an example of a control operation performed by the extension control unit 101.

First, the extension control unit 101 determines whether the remaining time of a reservation is equal to or shorter than a reference value (step S11). For example, whether the remaining time is equal to or shorter than 5 minutes is determined. Step S11 is repeatedly performed until a result thereof becomes positive. If the result of step S11 becomes positive, the extension control unit 101 estimates whether the user will exit in time (step S12).

FIGS. 8 to 11 illustrate an example of an estimation method used in the present exemplary embodiment.

FIG. 8 is a diagram illustrating an example of relationships between a user's conversational features and results of estimation.

In general, when a user is active (e.g., actively talking), the user is likely to extend a reservation. FIG. 8 indicates, as examples of active talking, cases where there are no breaks in conversation (i.e., the conversation keeps going), where the volume of voice is high, the amount of conversation is large, and where the frequency of voice is high.

The estimation based on these pieces of information may employ an average obtained from plural periods.

Alternatively, the estimation may be performed by performing comparison with information from a previous period. Because the volume of voice, the amount of conversation, and the frequency of voice vary between individuals, the accuracy of estimation improves by taking into consideration changes during use.

In addition, it is unlikely that the user will extend a reservation when the user has uttered a concluding phrase. FIG. 8 indicates "see you" and "next time" as examples of the concluding phrase.

FIG. 9 is a diagram illustrating an example of relationships between another user's situations and results of estimation.

When the user accompanies a partner (another user), a situation of the other user might be helpful in estimating whether the user will extend a reservation.

In general, when the other user is active or has extended a reservation, the user is likely to extend a reservation. FIG. 9 illustrates, as examples of cases where the other user is active, cases where there are no breaks in conversation and where the other user continues working.

In addition, when the other user is preparing to leave (e.g., putting a notebook or a personal computer (PC) into a bag), it is unlikely that the user will extend a reservation.

FIG. 10 is a diagram illustrating an example of relationships between types of work that the user is doing and results of estimation.

When the user continues using a PC, for example, the user is likely to extend a reservation. This holds true for other electronic devices such as a smartphone and tools such as a notebook. When the amount of work is large, too, the user is likely to extend a reservation, regardless of a type of work.

FIG. 11 is a diagram illustrating an example of device operation statuses and results of estimation. When a majority of devices 31 (refer to FIG. 1) included in the time-based rental space 3 are being used or when a network load is large, the user is likely to extend a reservation. Because the operation of the air conditioner 31A (refer to FIG. 5) is easily affected by outside temperature and humidity and a comfortable temperature and a comfortable humidity vary between individuals, it is desirable that information regarding the air conditioner 31A be excluded from information used for the estimation or not used for the estimation so much as other pieces of information.

FIG. 7 is referred to again.

After a result of estimation is obtained, the extension control unit 101 determines whether the user will exit (step S13).

If the extension control unit 101 determines that the user will exit, a result of step S13 is positive, and the extension control unit 101 ends the operation.

If the extension control unit 101 determines that the user will not exit, the result of step S13 is negative, and the operation proceeds to step S14. The extension control unit 101 determines whether a next reservation satisfies the certain condition.

This is because even if the extension control unit 101 determines that the user will not exit, it is difficult to extend the reservation when the next reservation starts immediately after the current reservation ends or when a gap between the current reservation and the next reservation is shorter than a tolerable threshold.

That is, in order to actually extend the reservation, an environment needs to allow the extension. In the present exemplary embodiment, an environment that allows extension of a reservation will be referred to as satisfying the certain condition.

The certain condition is that, for example, there be a period of time equal to or longer than a predetermined value before a next reservation starts.

FIG. 12 is a diagram illustrating an extendable period.

In an example illustrated in FIG. 12, Mr. A has reserved a time-based rental space 3 (space #1) installed in a certain place (point) from 13:00 to 14:00, and Mr. B has reserved the time-based rental space 3 from 15:00 to 15:30.

In this case, an extendable period of the space #1 for Mr. A is not up until 15:00 but a period obtained by subtracting a preparation period TO, which is an example of a predetermined period.

The preparation period TO includes time necessary to provide a comfortable environment for Mr. B, who is a next user of the time-based rental space 3. The preparation period TO is set by an organization on the basis of time necessary to restore the quality of air inside the time-based rental space 3. The time varies depending on the performance of the air conditioner 31A (refer to FIG. 5). Alternatively, the time-based rental space 3 may be simply ventilated.

Alternatively, the certain condition may be that an alternative space to be presented to a next user exist in the same place. When plural time-based rental spaces 3 are installed in the same place and another time-based rental space 3 in the same place can be assigned to a next user, the next user will not be inconvenienced even if a current user extends a reservation.

Alternatively, the certain condition may be, for example, that a next user accept to change a reservation. Although it might be inconvenient for a next user to change a reservation to a time-based rental space 3 installed in another place when the next user's reservation time is coming, this can be an option if the next user might accept the suggestion.

Figure 13A:
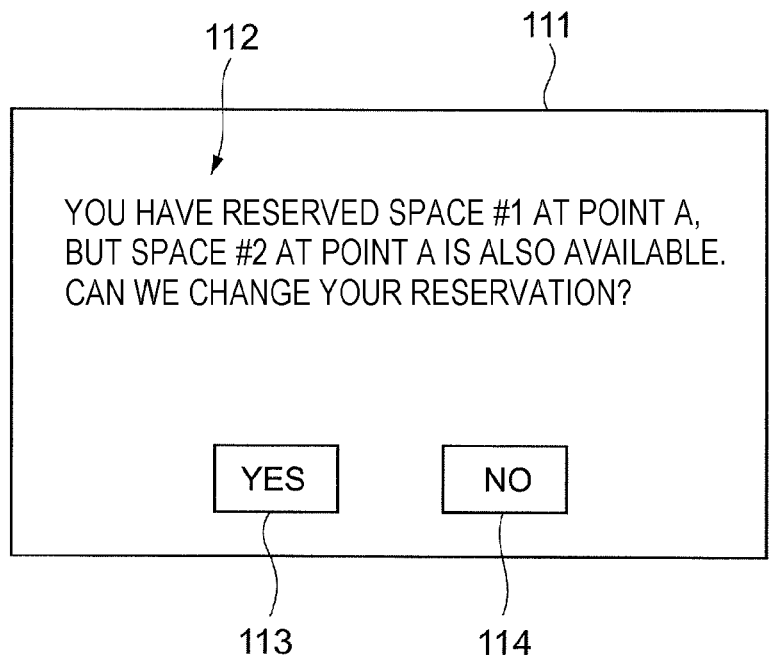
FIGS. 13A and 13B are diagrams illustrating an example of operation screens used to ask a next user whether to accept to change a reservation.
Figure 13B:
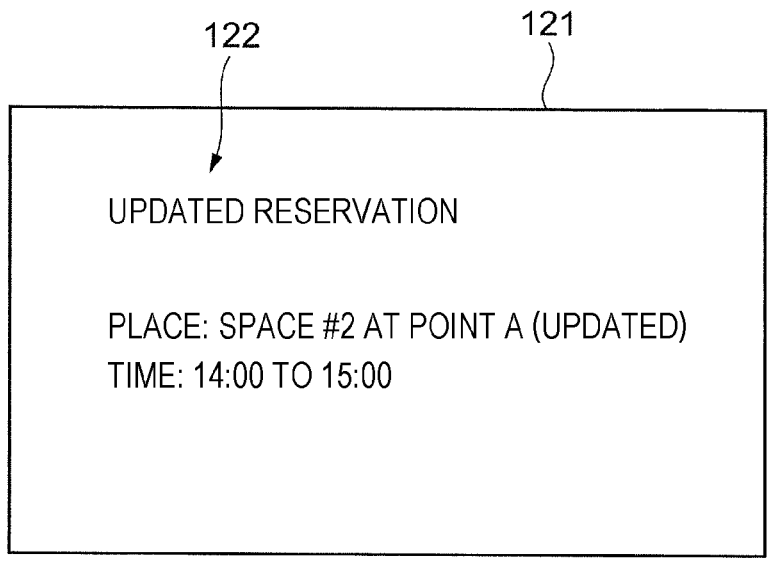

FIGS. 13A and 13B are diagrams illustrating an example of operation screens used to ask a next user whether to accept to change a reservation. FIG. 13A illustrates a screen 111 for notifying the next user of an alternative space and determining whether to accept to change the reservation. FIG. 13B illustrates an example of a screen 121 for notifying the next user of an updated reservation.

It is assumed in FIG. 13 that a current user has reserved the space #1 at point A from 13:00 to 14:00 and the next user has reserved the space #1 at point A from 14:00 to 15:00.

The screen 111 is displayed on a user terminal 4 (refer to FIG. 1) operated by the next user.

The screen 111 illustrated in FIG. 13 includes text 112 indicating that an adjacent space at the same point can be used as an alternative space, a button 113 for accepting to change the reservation, and a button 114 for rejecting the change.

When an alternative space is installed at the same point, inconvenience to the next user need not be taken into consideration if conditions such as available equipment are the same. The screen 111, therefore, may be omitted.

The screen 121 includes text 122 indicating an updated reservation. In this example, "updated" is added to an updated item.

Because the current user might not desire to extend a reservation, however, confirmation and notification regarding a change in the reservation may be performed in step S17 (refer to FIG. 7), which will be described later.

FIG. 7 is referred to again.

If a result of step S14 is positive, the extension control unit 101 determines whether the current user has permitted extension in advance (step S15). The user may permit extension as an item that can be input at a time of the reservation.

If a result of step S15 is negative, the extension control unit 101 determines whether the user desires to extend the reservation (step S16).

In step S16, the user is asked whether to extend the reservation. This is because the processing so far has been performed on the basis of estimation and the extension of the reservation charges the user.

Figure 14:
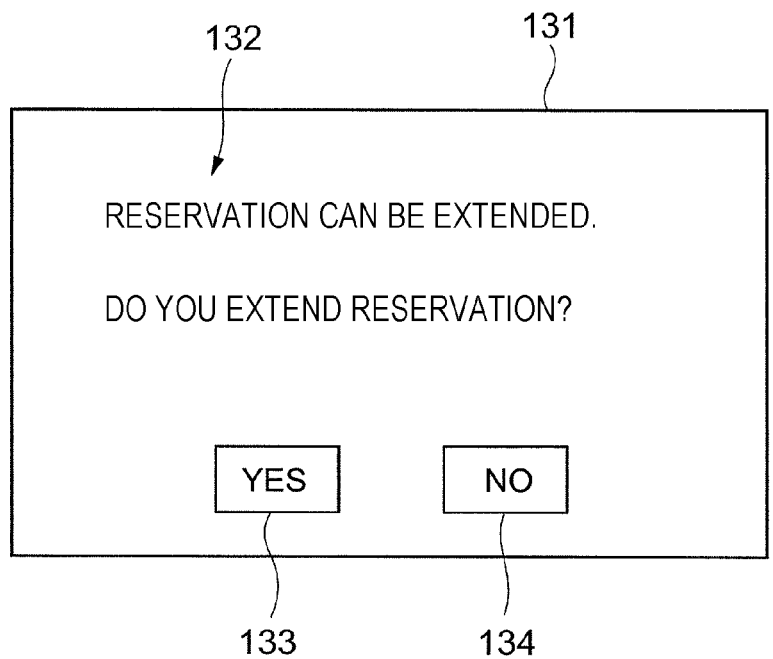
FIG. 14 is a diagram illustrating an example of a screen used to ask a current user whether to extend the reservation.

FIG. 14 is a diagram illustrating an example of a screen 131 used to ask the current user whether to extend a reservation.

The screen 131 is displayed on the user terminal 4 (refer to FIG. 1) operated by the current user or the display device 31F or 31M (refer to FIG. 5) provided inside the time-based rental space 3. Alternatively, the speaker 31N (refer to FIG. 5) may be used.

The screen 131 includes text 132 indicating that the reservation can be extended and whether to extend the reservation, a button 133 for extending the reservation, and a button 134 for rejecting the extension of the reservation.

FIG. 7 is referred to again.

If a result of step S16 is negative, the extension control unit 101 ends the operation without extending the reservation.

If the result of step S16 is positive, on the other hand, the extension control unit 101 extends the reservation and notifies the user of the extension (steps S17 and S18).

In the extension of the reservation performed in step S17, the extension control unit 101 communicates with the reservation management server 5 (refer to FIG. 1) and confirms a reservation in a time period secured as an additional reservation.

The extension of a reservation may be performed in a predetermined time unit (e.g., 10 minutes) or a time unit input or selected by the user, or may be performed within a range of a predetermined amount of money (e.g., 1,000 yen).

Figure 15:
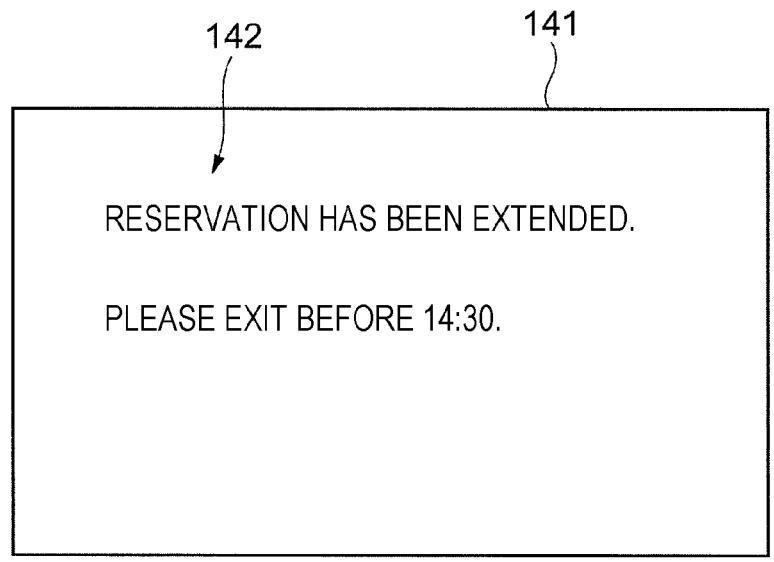
FIG. 15 is a diagram illustrating an example of a screen used to notify the user of a use condition after extension.

In step S18, the user is notified of a use condition after the extension. FIG. 15 is a diagram illustrating an example of a screen 141 used to notify the user of the use condition after the extension.

The screen 141 illustrated in FIG. 15 includes text 142 indicating that the reservation has been extended and an end of a new reservation period. In the example illustrated in FIG. 15, the reservation of the current user has been extended from 14:00 by 30 minutes.

FIG. 7 is referred to again.

A case where the result of step S14 is negative will be described hereinafter.

In this case, the next reservation does not satisfy the certain condition, and the reservation of the same time-based rental space 3 is not extended.

First, the extension control unit 101 determines whether to reserve another time-based rental space 3 (step S19).

If a result of step S19 is negative, the extension control unit 101 ends the operation without reserving another space.

If the result of step S19 is positive, on the other hand, the extension control unit 101 presents other available spaces in consideration of current reservation conditions and the like (step S20). The extension control unit 101 then confirms a reservation of a space selected by the user (step S21).

Processing relating to the reservation will be described with reference to FIGS. 16 to 18C.

Figure 16:
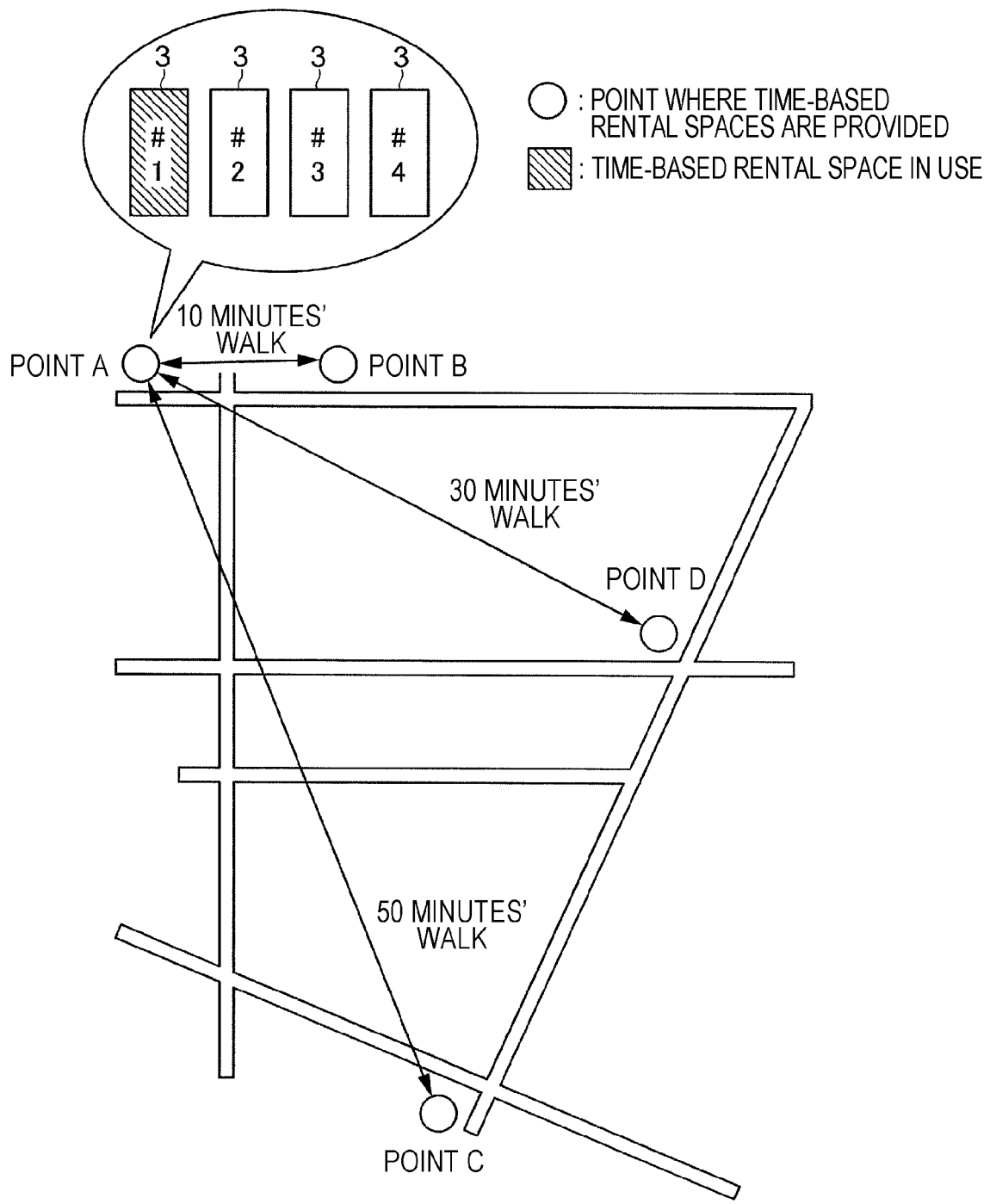
FIG. 16 is a diagram illustrating a positional relationship between a time-based rental space in use and other time-based rental spaces.

FIG. 16 is a diagram illustrating a positional relationship between the time-based rental space 3 in use and other time-based rental spaces 3.

In FIG. 16, points A to D at which the time-based rental spaces 3 are installed are indicated by circles. One or plural time-based rental spaces 3 are installed at each point. The number of time-based rental spaces 3 installed at each point varies.

It is assumed in FIG. 16 that the user is using one (space #1) of four time-based rental spaces 3 installed at point A.

A distance between points A and B is a 10 minutes' walk, a distance between points A and C is a 50 minutes' walk, and a distance between points A and D is a 30 minutes' walk.

FIG. 17 is a diagram illustrating an example of a table 151 referred to when the extension control unit 101 (refer to FIG. 6) presents alternative spaces to the user.

The table 151 indicates a list of available time-based rental spaces 3 at a time when step S19 (refer to FIG. 7) is performed.

In the example illustrated in FIG. 17, two time-based rental spaces 3 at point A and one time-based rental space 3 at each of points B to D are extracted as alternative spaces.

The table 151 includes distances (time) 152 to destinations, transportation costs 153, available periods 154, equipment 155, items that are not illustrated, and overall evaluation 156.

When the distances 152 to the destinations are indicated by time, a speed of 80 meters per minute, for example, is used. The speed, however, may be changed on the basis of a setting such as slow, normal, or fast. Alternatively, direct distances or actual distances from a current point may be used as the distances 152 to the destinations.

The transportation costs 153 are costs of transportation facilities. The available periods 154 are available periods of time after the user arrives at the destinations. The equipment 155 may be evaluated on the basis of a degree of matching with desirable conditions input by the user when the user has reserved the time-based rental space 3 in use or a degree of matching with equipment provided for the time-based rental space 3 in use.

In the example illustrated in FIG. 17, a time-based rental space 3 (#2) at point A that is close to the time-based rental space 3 in use and whose transportation cost is low is evaluated as a first place. Next, a time-based rental space 3 (#4) at point B is evaluated as a second place. At this time, other time-based rental spaces 3 installed at the same point (point A in this example) as the time-based rental space 3 in use may take priority in evaluation.

If there is a communication partner and the other user needs to move to another time-based rental space 3, other spaces may be evaluated such that transportation costs of both users become low. When corporations are using time-based rental spaces 3, users pay transportation costs on the corporations' behalf, it is economically reasonable to evaluate other spaces such that overall costs become low.

Figure 18A:
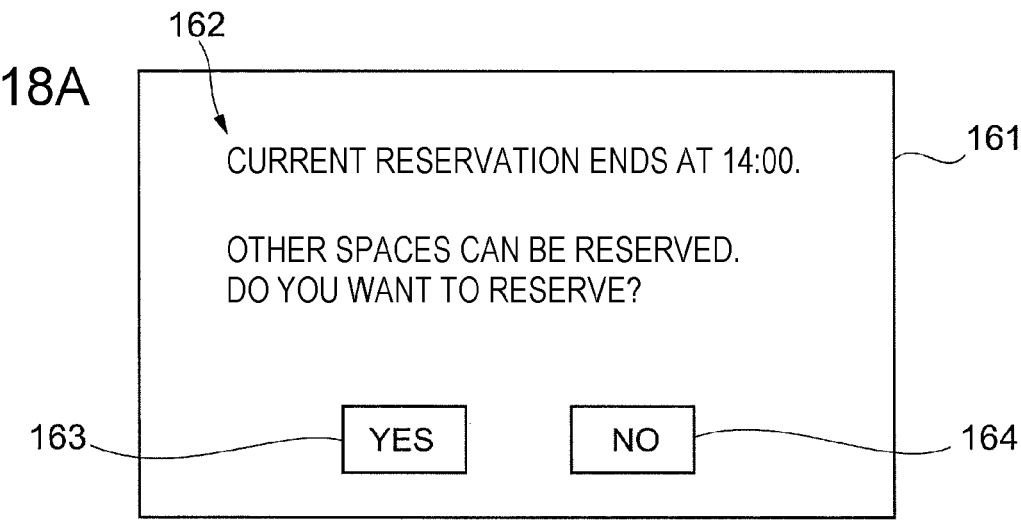
FIGS. 18A to 18C are diagrams illustrating an example of screens used to present other time-based rental spaces when it is difficult to extend a reservation of the time-based rental space in use.
Figure 18B:
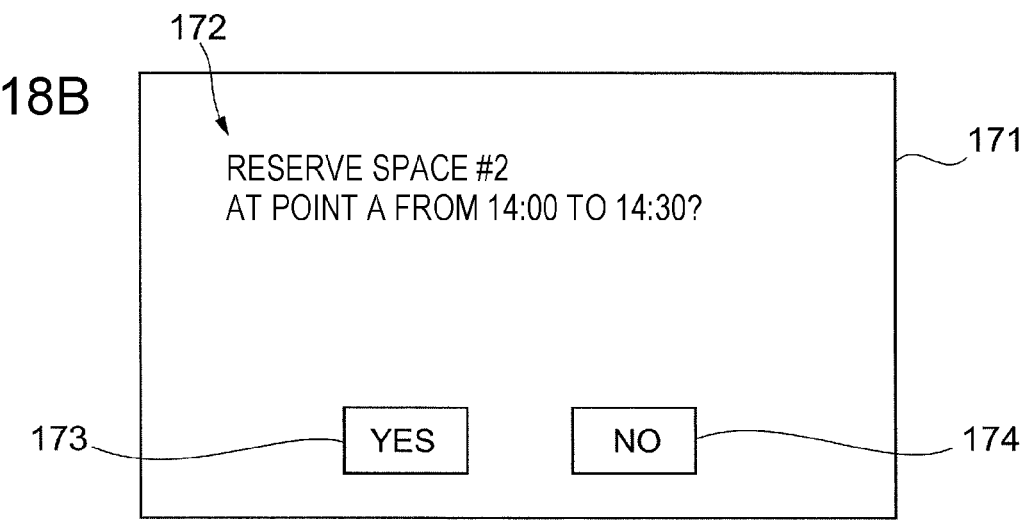
Figure 18C:
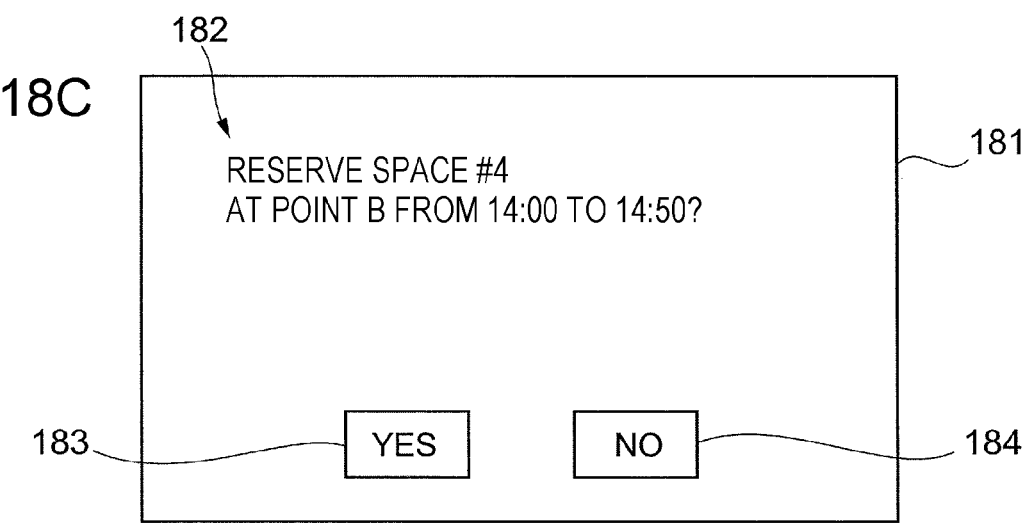

FIGS. 18A to 18C are diagrams illustrating an example of screens used to present other time-based rental spaces 3 when it is difficult to extend the reservation of the time-based rental space 3 in use. FIG. 18A illustrates a screen 161 for asking the user whether to reserve another space. FIG. 18B illustrates a screen 171 for presenting a first-place space. FIG. 18C illustrates a screen 181 for presenting a second-place space.

The screen 161 includes text 162 indicating that the current reservation ends at 14:00, that other spaces can be reserved, and whether to reserve another space, a button 163 operated when the user desires to reserve another space, and a button 164 operated when the user does not desire to reserve another space.

The screen 171 for presenting the first-place space includes text 172 indicating that the space #2 at point A can be reserved from 14:00 to 14:30, a reservation button 173, and a cancel button 174.

The screen 181 for presenting the second place space includes text 182 indicating that the space #4 at point B can be reserved from 14:00 to 14:50, a reservation button 183, and a cancel button 184.

When the reservation button 173 or 183 is clicked, a reservation is confirmed. When the cancel button 174 or 184 is clicked, a screen for presenting another space is displayed.

In the present exemplary embodiment, spaces are presented to the user in descending order of evaluation, but plural spaces may be displayed as a list.

As described above, with the method according to the present exemplary embodiment, an operation load necessary to extend a reservation is reduced. Even when a user is actively talking or working, therefore, the user can extend a reservation while concentrating upon the conversion or the work.

In addition, since the user needs to make a setting or issue an instruction to confirm extension of a reservation performed by the extension control unit 101, the user can avoid unintended extension.

In addition, with the method according to the present exemplary embodiment, the user can extend a reservation without inconveniencing a next user.

In addition, even when it is difficult to extend a reservation, the extension control unit 101 presents other available time-based rental spaces 3. The user, therefore, can reserve another time-based rental space 3 while concentrating upon conversion or work. That is, an operation load of the user is reduced.

Modifications

Although an exemplary embodiment of the present invention has been described above, the technical scope of the present invention is not limited to the above exemplary embodiment. It is evident from the claims that the technical scope of the present invention also includes modes obtained by modifying or improving the above exemplary embodiment in various ways.

Figure 19:
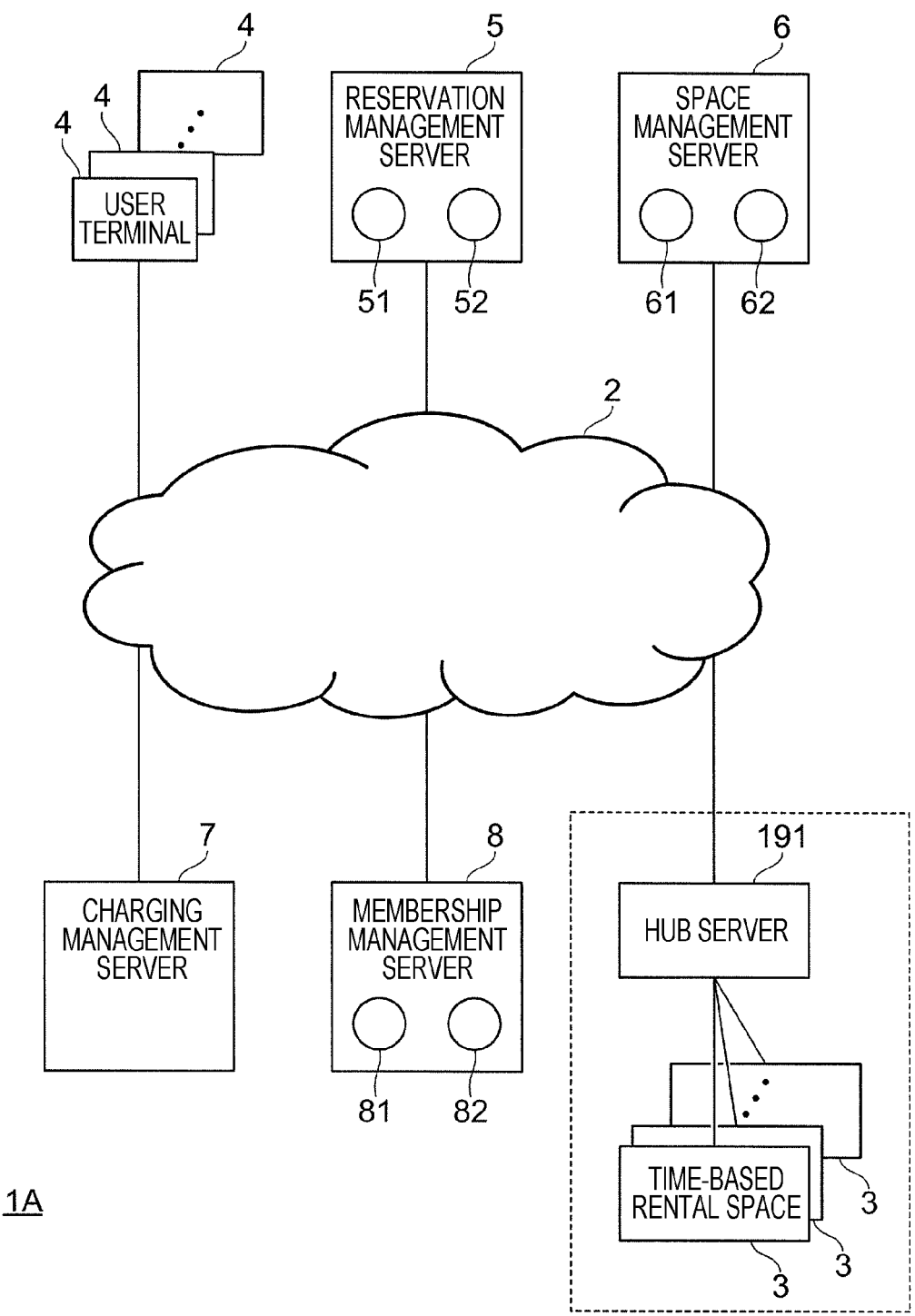
FIG. 19 is a diagram illustrating an example of the configuration of another management system.

The management system 1 (refer to FIG. 1), for example, is not limited to the above-described configuration. FIG. 19 is a diagram illustrating an example of the configuration of a management system 1A. In FIG. 19, the same components as those illustrated in FIG. 1 are given the same reference numerals. The management system 1A is different from the management system 1 (FIG. 1) in that a hub server 191 that manages plural time-based rental spaces 3 is used. The hub server 191, which has the configuration of a computer, may perform the function of the extension control unit 101 (refer to FIG. 6) by executing a program. In this sense, the hub server 191 is an example of an apparatus in the claims.

Although a soundproof chamber is assumed as a time-based rental space 3 in the above exemplary embodiment as illustrated in FIG. 2, the time-based rental space 3 may be a rental meeting room, a rental study room, or one of various guest rooms, insofar as the above-described situations can occur during use.

Although the door 32 can be locked in the above exemplary embodiment, the above-described control function may be used when the door 32 is not lockable.

Although a time-based rental space is assumed in the above exemplary embodiment, a space need not necessarily be rented on the basis of time.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An apparatus comprising:
    a hardware transceiver, communicating with a plurality of devices configured in a space and collecting operation conditions of the plurality of devices through a network; and
    a processor, in response to a majority of the plurality of devices being used and a next reservation of the space satisfying a certain condition, extending a current reservation of the space, wherein the majority of the plurality of devices being used is determined based on the collected operation conditions of the devices comprising a human detection sensor, a lighting device, a printing device, a computer, a display device, an input device, a control device, a communication interface, a door open/close mechanism, an open/close locking mechanism, a monitoring camera, a speaker, a microphone, a temperature sensor, a humidity sensor, a magnetic sensor, an acceleration sensor, a mat sensor, and an air monitor in the space.

2. The apparatus according to claim 1,
    wherein, if the user has not permitted extension of the current reservation in advance, the current reservation is not extended.

3. The apparatus according to claim 2,
    wherein the user is asked whether to extend the current reservation before the current reservation ends.

4. The apparatus according to claim 2,
    wherein the user is notified that the current reservation has been extended before the current reservation ends.

5. The apparatus according to claim 1,
wherein the user is asked whether to extend the current reservation before the current reservation ends.

6. The apparatus according to claim 5,
wherein a terminal operated by the user is used to determine whether to extend the current reservation.

7. The apparatus according to claim 1,
wherein the certain condition is that there be a predetermined period of time or more between an end of the current reservation of the space that is being used by the user and a start of the next reservation.

8. The apparatus according to claim 1,
wherein the certain condition is that an alternative available space to be presented to a next user exist in a same place.

9. The apparatus according to claim 1,
wherein the certain condition is that a next user accept to change the next reservation of the space.

10. The apparatus according to claim 1,
wherein, if the next reservation does not satisfy the certain condition, an alternative available space is obtained.

11. The apparatus according to claim 10,
wherein the alternative available space is presented.

12. The apparatus according to claim 11,
wherein another space in a same place takes priority in the presentation of the alternative available space.

13. A management system comprising:
a hardware transceiver, communicating with a plurality of devices configured in a space and collecting operation conditions of the plurality of devices through a network;
a database storing space management data; and
a processor, in response to a majority of the plurality of devices being used and a next reservation of the space satisfying a certain condition, extending a current reservation of the space, wherein the majority of the plurality of devices being used is determined based on the collected operation conditions of the devices comprising a human detection sensor, a lighting device, a printing device, a computer, a display device, an input device, a control device, a communication interface, a door open/close mechanism, an open/close locking mechanism, a monitoring camera, a speaker, a microphone, a temperature sensor, a humidity sensor, a magnetic sensor, an acceleration sensor, a mat sensor, and an air monitor in the space.

14. A non-transitory computer readable medium storing a program causing a processor of a computer to:
communicate with a plurality of devices configured in a space and collect operation conditions of the plurality of devices through a network by a hardware transceiver; and
in response to a majority of the plurality of devices being used and a next reservation of the space satisfying a certain condition, extend a current reservation of the space, wherein the majority of the plurality of devices being used is determined based on the collected operation conditions of the devices comprising a human detection sensor, a lighting device, a printing device, a computer, a display device, an input device, a control device, a communication interface, a door open/close mechanism, an open/close locking mechanism, a monitoring camera, a speaker, a microphone, a temperature sensor, a humidity sensor, a magnetic sensor, an acceleration sensor, a mat sensor, and an air monitor in the space.

* * * * *